No. 792,832. PATENTED JUNE 20, 1905.
F. J. LAMPTON.
HARVESTER.
APPLICATION FILED MAR. 21, 1905.
2 SHEETS—SHEET 1.
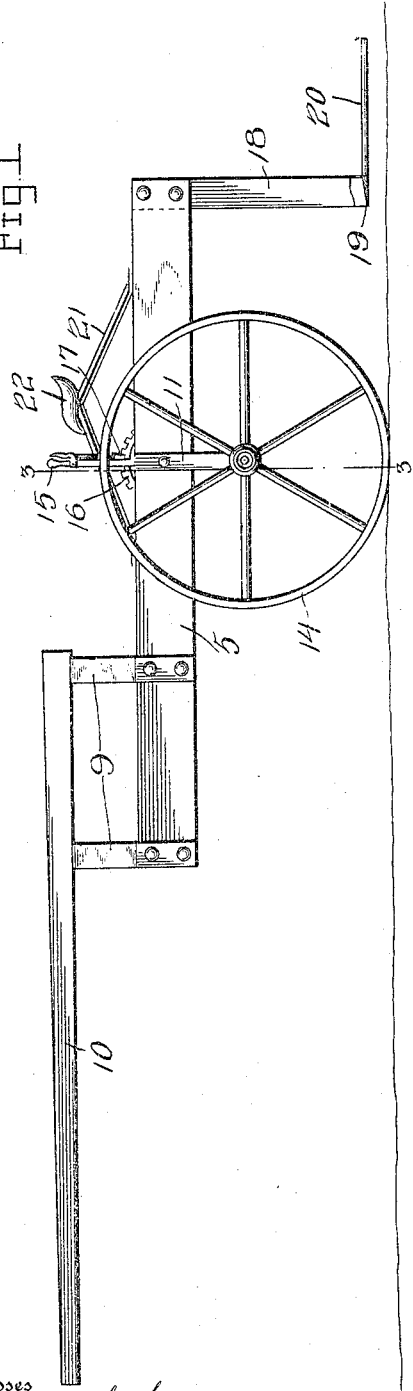
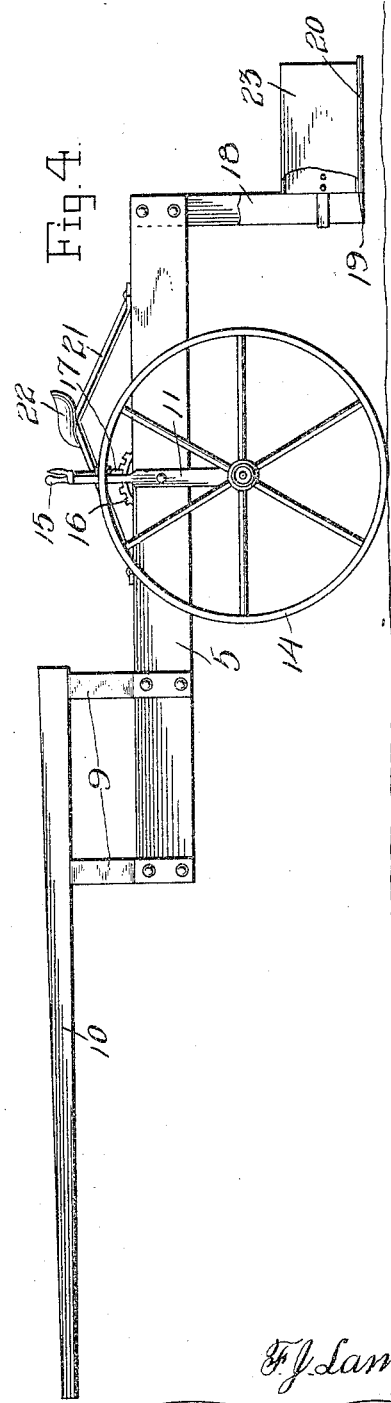
Witnesses
C. K. Reichenbach.
E. M. Colford
Inventor
F. J. Lampton.
By Chandler & Chandler
Attorneys

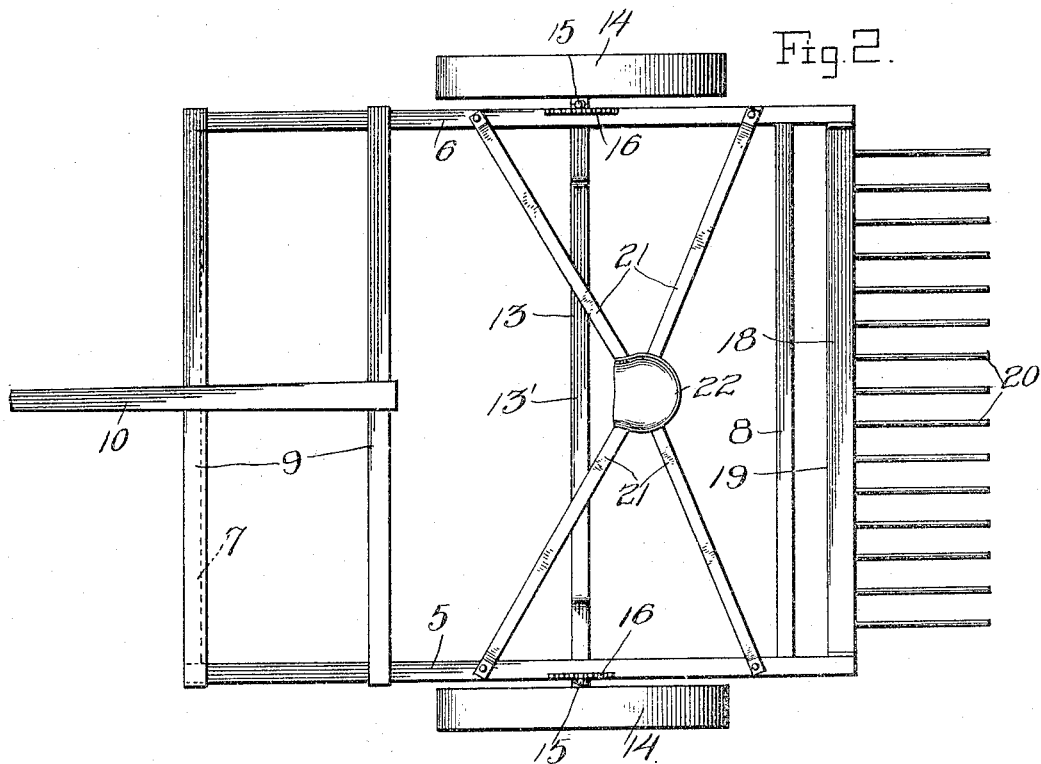
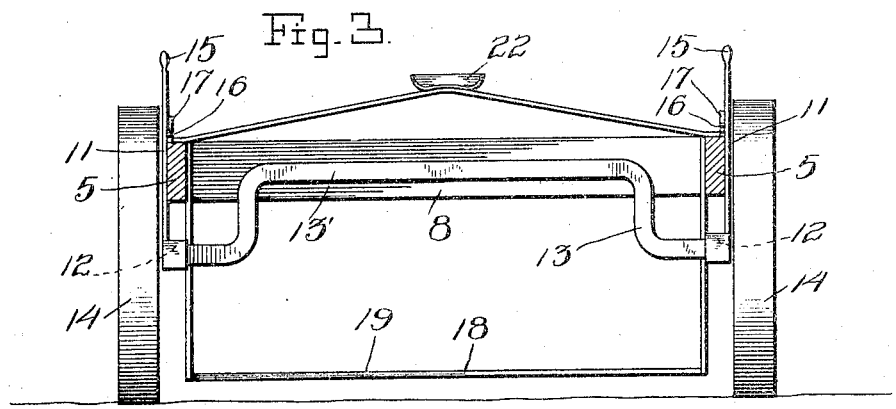

No. 792,832. Patented June 20, 1905.

UNITED STATES PATENT OFFICE.

FLAVIUS J. LAMPTON, OF BEEVILLE, TEXAS, ASSIGNOR OF ONE-HALF TO J. H. THOMPSON, OF BEEVILLE, TEXAS.

HARVESTER.

SPECIFICATION forming part of Letters Patent No. 792,832, dated June 20, 1905.

Application filed March 21, 1905. Serial No. 251,194.

*To all whom it may concern:*

Be it known that I, FLAVIUS J. LAMPTON, a citizen of the United States, residing at Beeville, in the county of Bee, State of Texas, have invented certain new and useful Improvements in Harvesters; and I do hereby declare the following to be a full, clear, and exact description of the invention, such as will enable others skilled in the art to which it appertains to make and use the same.

This invention relates to farm implements, and more particularly to harvesters, and has for its object to provide an implement of this kind which may be used for harvesting different products and which will be so arranged that it may be regulated to suit different conditions.

Another object is to provide a harvester which may be used for cutting cotton-stalks and which will be provided with an attachment by means of which it may be converted into an onion-harvester.

Other objects and advantages will be apparent from the following description, and it will be understood that modifications of the specific construction shown may be made, and any suitable materials may be used for the various parts without departing from the spirit of the invention.

In the drawings forming a portion of this specification, and in which like numerals of reference indicate similar parts in the several views, Figure 1 is a side elevation of the present invention. Fig. 2 is a top plan view. Fig. 3 is a section on line 3 3 of Fig. 1. Fig. 4 is a view similar to Fig. 1, showing the attachment in position behind the cutting-yoke.

Referring now to the drawings, the present invention comprises spaced longitudinally-extending sills 5 and 6, which are connected at their forward ends by a transverse member 7, a similar member 8 being secured therebetween adjacent to their rearward ends, the sills extending rearwardly beyond the member 8, as shown. Extending upwardly from the sills 5 and 6 adjacent to their forward ends are longitudinally-spaced pairs of convergent upwardly-extending supports 9, which have secured to their upper ends the rearward portion of a draft-pole 10. Pivoted to the outer face of each of the sills 5 and 6 there is a vertically-extending plate 11, which depends below its pivot-point, and these plates are provided with alining openings 12 in their depending portions, and engaged in these openings there is a transversely-extending axle 13, with which ground-wheels 14 are engaged outwardly of the plates 11.

The plates 11 are provided with upwardly-extending hand-levers 15, by which the plates may be moved upon their pivots to shift the axle in an arc, thus raising or lowering the sills, as will be readily understood. Rack-segments 16 are secured to the upper faces of the sills 5 and 6 and are disposed for engagement by spring-actuated dogs 17, carried by the hand-levers 15. Secured at its upper ends between the rearwardly-extending portions of the sills 5 and 6 there is a depending U-shaped cutting-yoke 18, which is sharpened at its forward edge 19. The ends of the spaced legs of the yoke are secured against the inner faces of the sills, and the sills may be raised and lowered, as described above, to bring the bight portion of the yoke into and out of position to enter the ground. Extending from the rearward edge of the yoke there are a plurality of spaced fingers 20.

When the implement is to be used for the purpose of cutting cotton-stalks, the sills are lowered to permit the sharpened edge 19 of the bight of the yoke 18 to come into engagement with the stalks at the desired point. When the implement is moved over the ground, the stalks will be cut by the yoke, as will be readily understood, the stalks falling rearwardly between the spaced portions of the yoke upon the fingers 20 and thence to the ground. The axle 13 is arched upwardly between its ends, as shown at 13', to bring its central portion above the stalks of the cotton.

A seat-bracket including four divergent legs 21 is provided, these legs being joined together at their upper ends, and the lower ends of two of these legs are secured to each of the sills 5 and 6, the forward pair of the legs being disposed forwardly of the axle 13, while the rearward pair lie rearwardly thereof. A seat 22 is secured to the bracket at the meeting points of its legs 21, this seat lying rearwardly of the axle and thereabove, the seat being so disposed that the occupant thereof may rest his feet upon the arched portion of the axle. The seat is also located between the levers 15, so that the latter may be grasped simultaneously by the occupant of the seat.

An attachment 23, which is in the form of a receptacle open at one end, is provided and may be connected with the implement at the rearward side of the yoke 18, resting upon the fingers 20 and with its open end extending forwardly, and when in this position the attachment is disposed to receive onions or similar articles which may be dug up by the yoke, it being understood that the yoke may be lowered to enter the ground a sufficient distance to dig up such articles.

What is claimed is—

1. An implement of the class described comprising spaced sills, axle-supporting members pivoted to the sills, an axle engaged in the members below their pivot-points, wheels carried by the axle, rack-segments secured to the upper faces of the sills, operating-levers connected with the axle-supporting members, spring-actuated dogs carried by the levers and disposed for engagement of the rack-segments to hold the levers with the members at different points of their movement upon their pivots, a bracket secured between the sills, a seat carried by the bracket and located adjacent to the levers and rearwardly of the axle, said axle being arched upwardly between the sills to receive the feet of an occupant of the seat and to bring its central portion out of position to engage plants beneath the implement, a cutting-yoke having a sharpened cutting edge disposed with its bight directed downwardly and with the free ends of its spaced portions secured to the rearward ends of the sills, rearwardly-extending fingers carried by the yoke at its bight portion, and a receptacle having an open end disposed upon the fingers with its open end extending forwardly, said receptacle being detachably connected with the sills.

2. An implement of the class described, comprising spaced sills, ground-wheels connected with the sills, said sills being shiftable vertically with respect to the ground-wheels, means for holding the sills at different points of their vertical movement, forward and rearward transverse members secured between the sills, said sills extending rearwardly beyond the rearward member, a cutting-yoke comprising a bight portion, and spaced legs secured at the ends of its legs to the rearward ends of the sills, said yoke depending below the sills, said bight portion having its forward edge sharpened, and rearwardly-extending fingers carried by the bight portion.

In testimony whereof I affix my signature in presence of two witnesses.

FLAVIUS J. LAMPTON.

Witnesses:
J. H. THOMPSON,
T. M. COX.